(12) United States Patent
Grolimund et al.

(10) Patent No.: US 10,549,357 B2
(45) Date of Patent: Feb. 4, 2020

(54) MANDREL ASSEMBLY FOR ELECTRIC TOOL AND ELECTRIC TOOL HAVING SAME

(71) Applicant: Bosch Power Tools (China) Co. Ltd., Hangzhou, Zhejiang (CN)

(72) Inventors: Daniel Grolimund, Zuchwil (CH); Donghui Ding, Zhejiang (CN)

(73) Assignee: Bosch Power Tools (China) Co., Ltd., Hangzhou (CN)

( * ) Notice: Subject to any disclaimer, the term of this patent is extended or adjusted under 35 U.S.C. 154(b) by 0 days.

(21) Appl. No.: 15/714,658

(22) Filed: Sep. 25, 2017

(65) Prior Publication Data

US 2018/0085834 A1 Mar. 29, 2018

(30) Foreign Application Priority Data

Sep. 27, 2016 (CN) .......................... 2016 1 0852003

(51) Int. Cl.
  *B23B 51/04* (2006.01)
  *B23B 31/00* (2006.01)
  *B23B 51/05* (2006.01)

(52) U.S. Cl.
  CPC ........ *B23B 51/0473* (2013.01); *B23B 31/008* (2013.01); *B23B 51/05* (2013.01); *B23B 2251/02* (2013.01); *B23B 2251/428* (2013.01); *B23B 2251/606* (2013.01)

(58) Field of Classification Search
  CPC ............... Y10T 408/95; Y10T 408/895; Y10T 408/8957; B23B 51/04; B23B 51/0473; B23B 51/05
  See application file for complete search history.

(56) References Cited

U.S. PATENT DOCUMENTS

| | | | | |
|---|---|---|---|---|
| 6,623,220 | B2 * | 9/2003 | Nuss ................... | B23B 31/1071 279/75 |
| 2005/0025592 | A1 * | 2/2005 | Cantlon .............. | B23B 51/0473 408/204 |
| 2007/0160435 | A1 * | 7/2007 | Chao ................... | B23B 31/1071 408/102 |
| 2007/0269280 | A1 * | 11/2007 | Vasudeva ............. | B23B 31/008 408/204 |

(Continued)

FOREIGN PATENT DOCUMENTS

TW 20113578 U1 * 10/2001 ......... B23B 51/0426

*Primary Examiner* — Alan Snyder
*Assistant Examiner* — Yasir A Diab
(74) *Attorney, Agent, or Firm* — Maginot, Moore & Beck LLP

(57) ABSTRACT

A mandrel assembly includes a mandrel, adapter, and bit coupler. The mandrel includes a shank part axially disposed in the mandrel, an adapter receiver, and a coupler receiver. An internal hole runs axially through the adapter. The coupler includes first and second axial sections, and an axial bit connection hole with a polygonal section proximate to an inner side, and a cylindrical section proximate to an opening. An outer wall of the adapter fits with an inner wall of the adapter receiver. An outer wall of the first section fits with an inner wall of the coupler receiver. An outer wall of the second coupler fits with the internal hole of the adapter. The mandrel transmits torque, via the adapter receiver and coupler receiver, to the adapter and then to a hole saw coupled to the adapter, and to the coupler and then to a bit coupled to the coupler.

10 Claims, 14 Drawing Sheets

(56) References Cited

U.S. PATENT DOCUMENTS

2014/0183827 A1\* 7/2014 Keightley ............. B23B 31/005
　　　　　　　　　　　　　　　　　　　　　279/30
2014/0255117 A1\* 9/2014 Tseng ................. B23B 51/0473
　　　　　　　　　　　　　　　　　　　　　408/204

\* cited by examiner

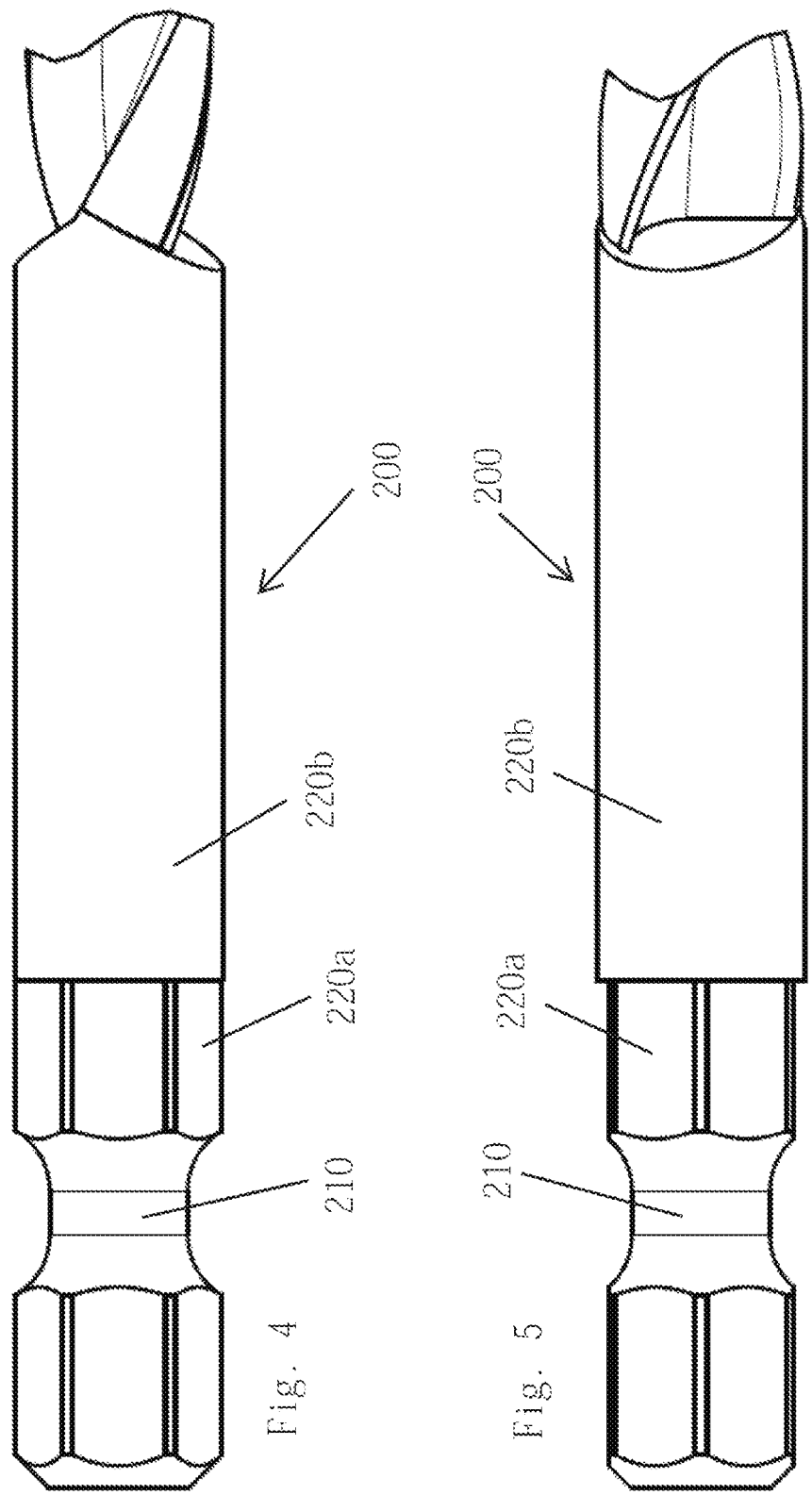

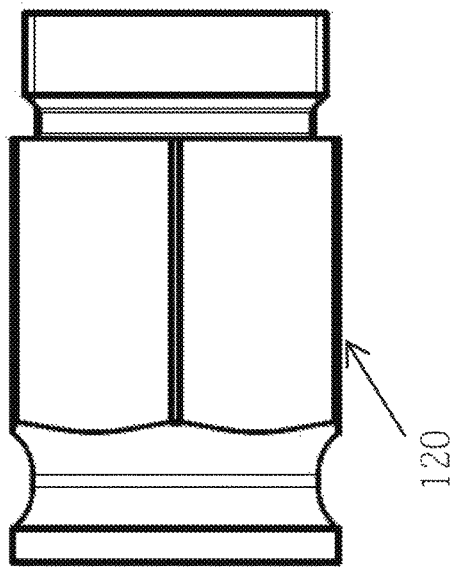
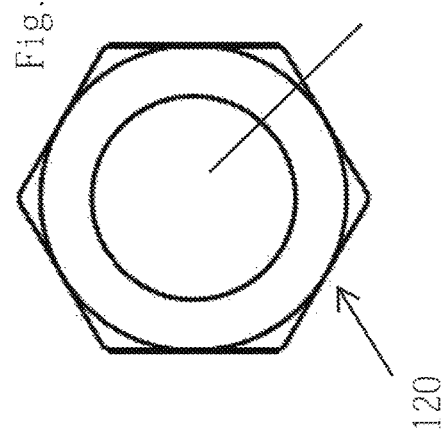
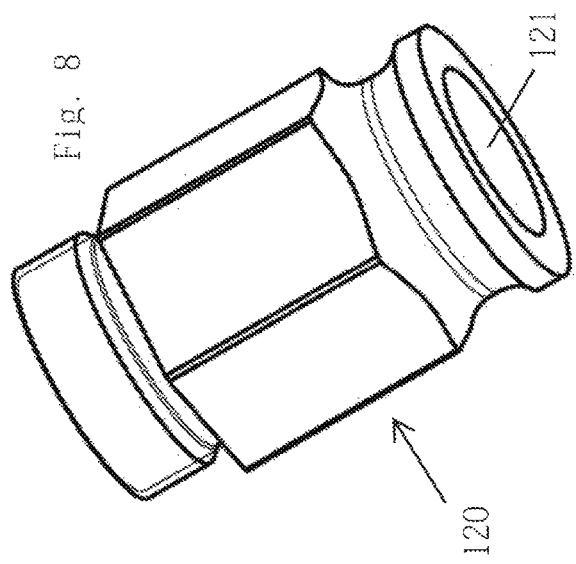
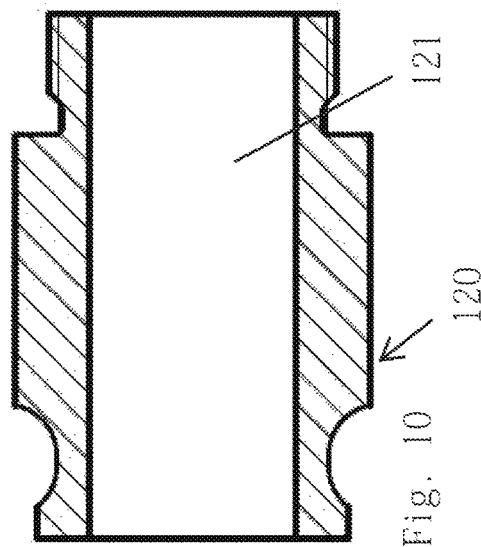

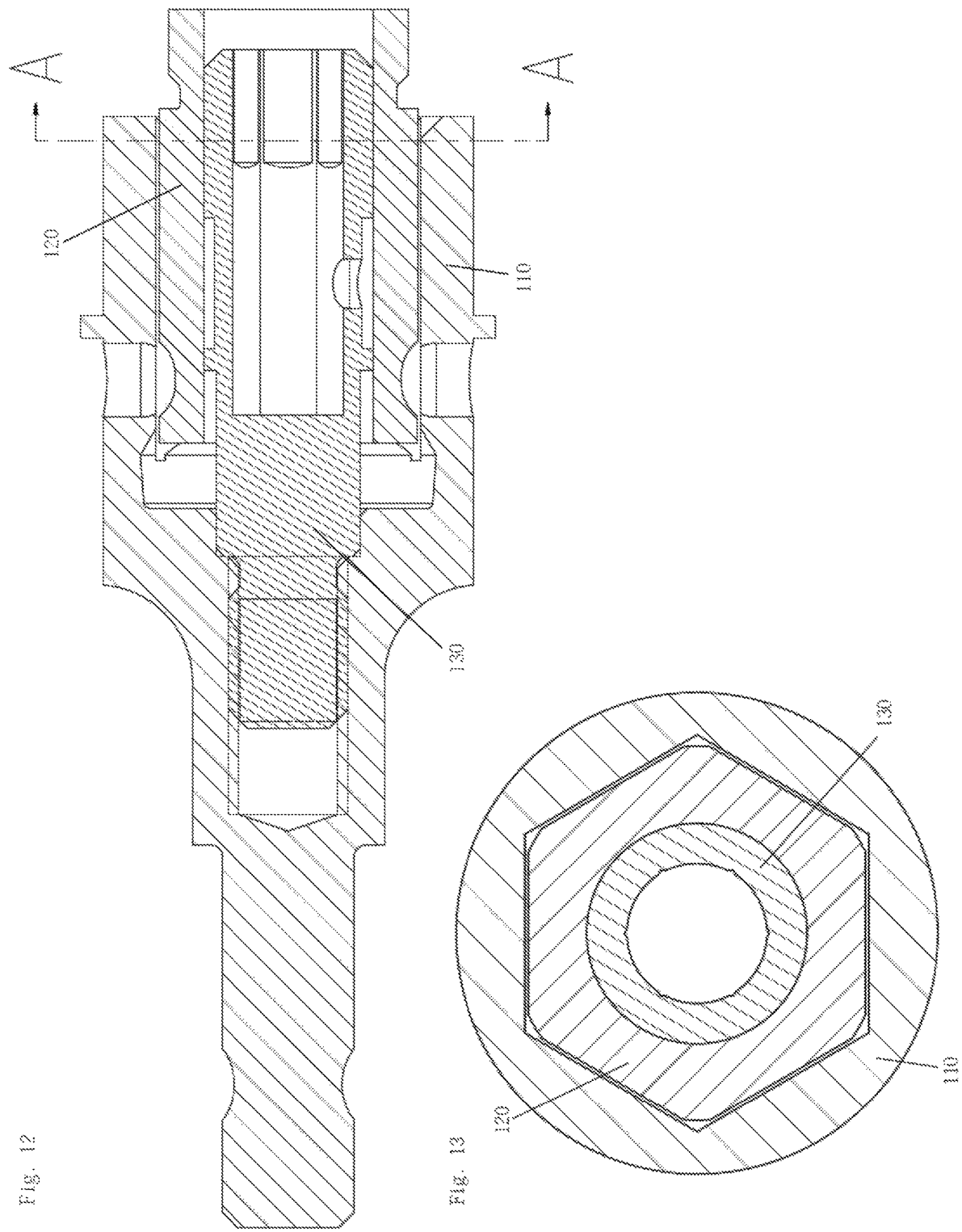

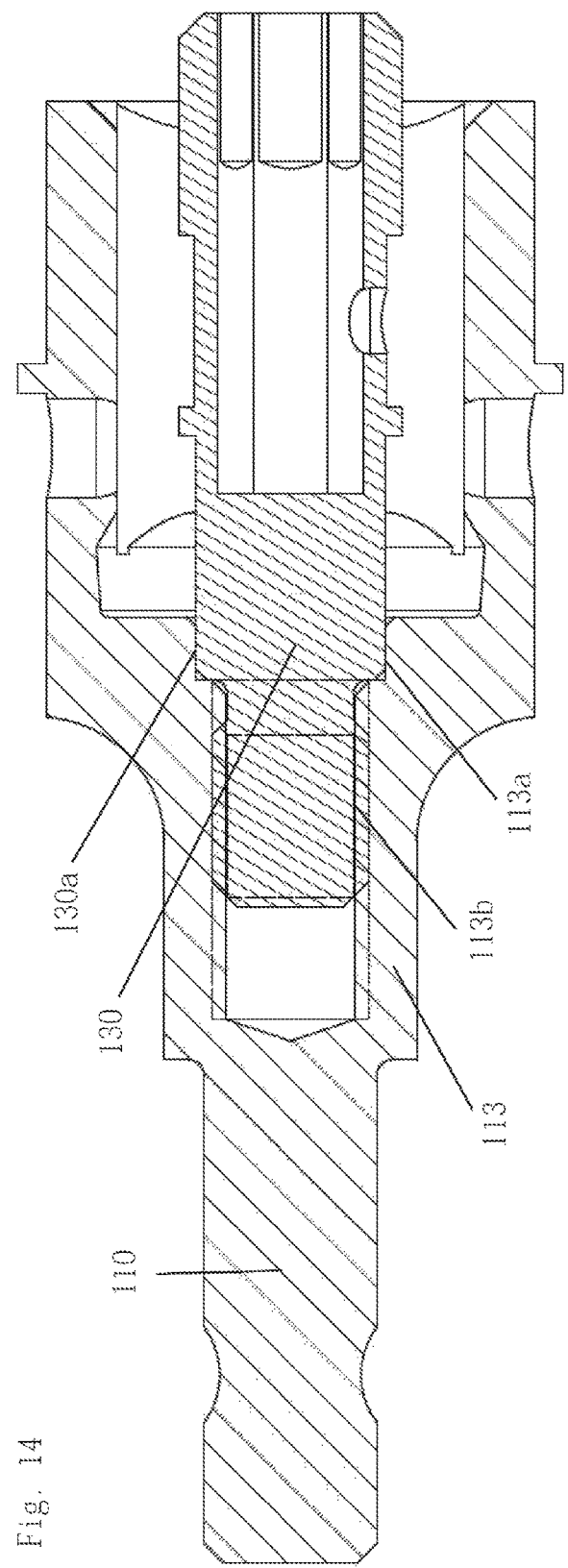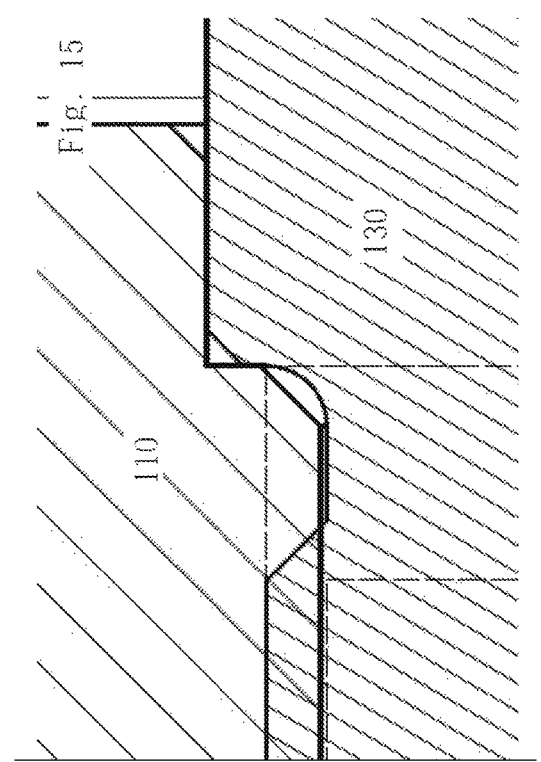

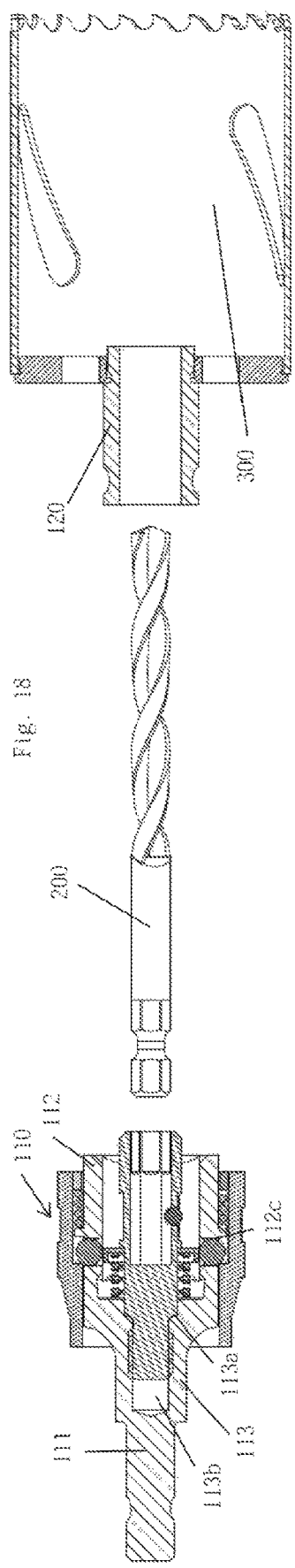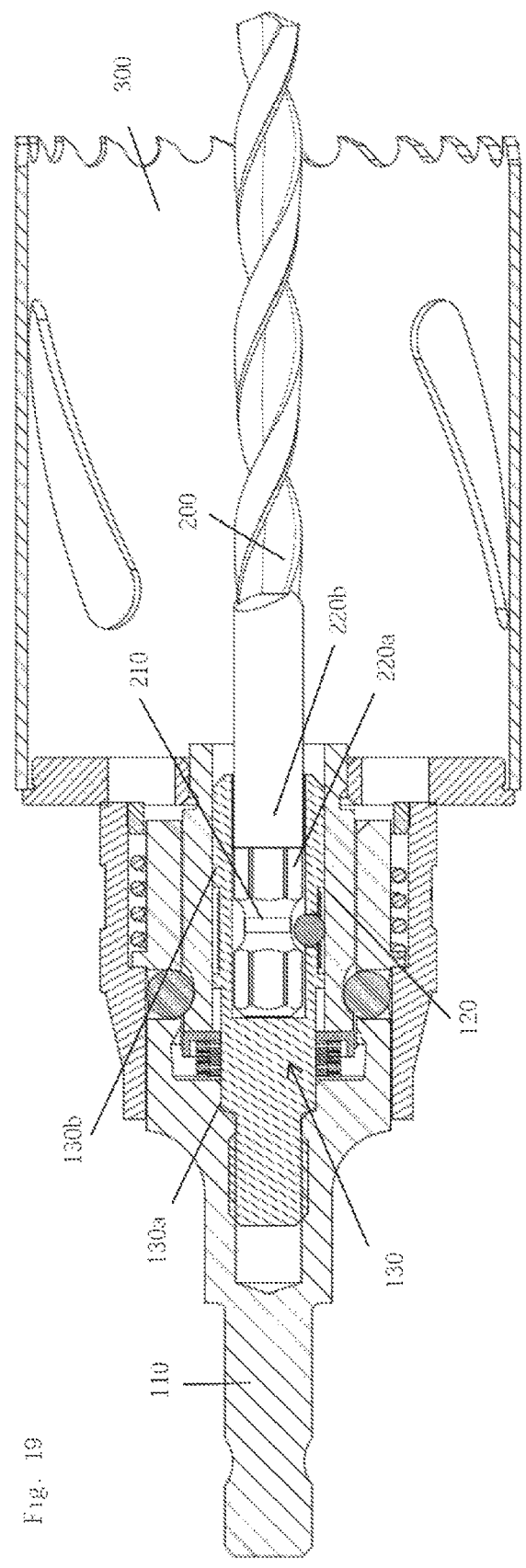

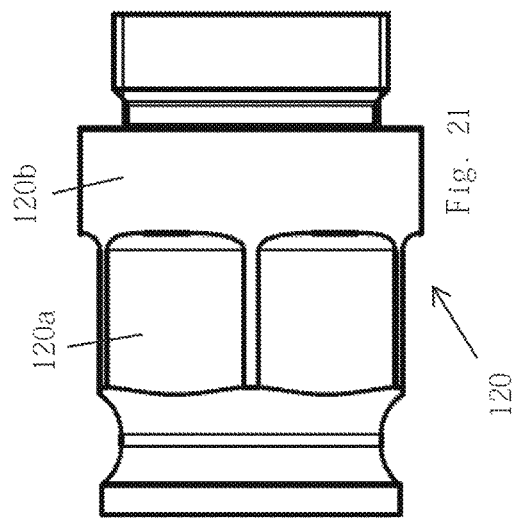
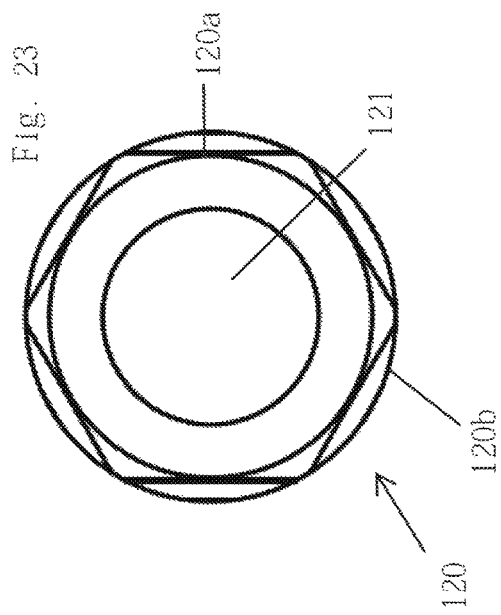
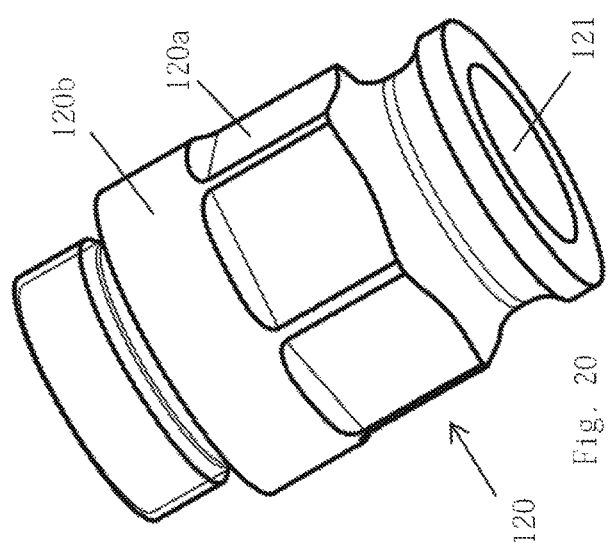
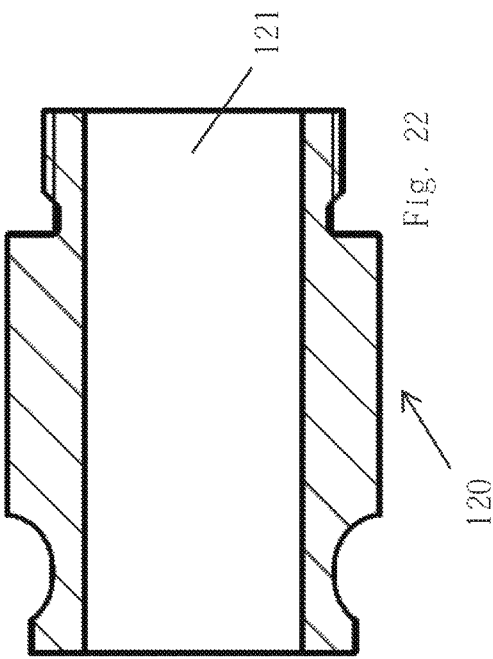

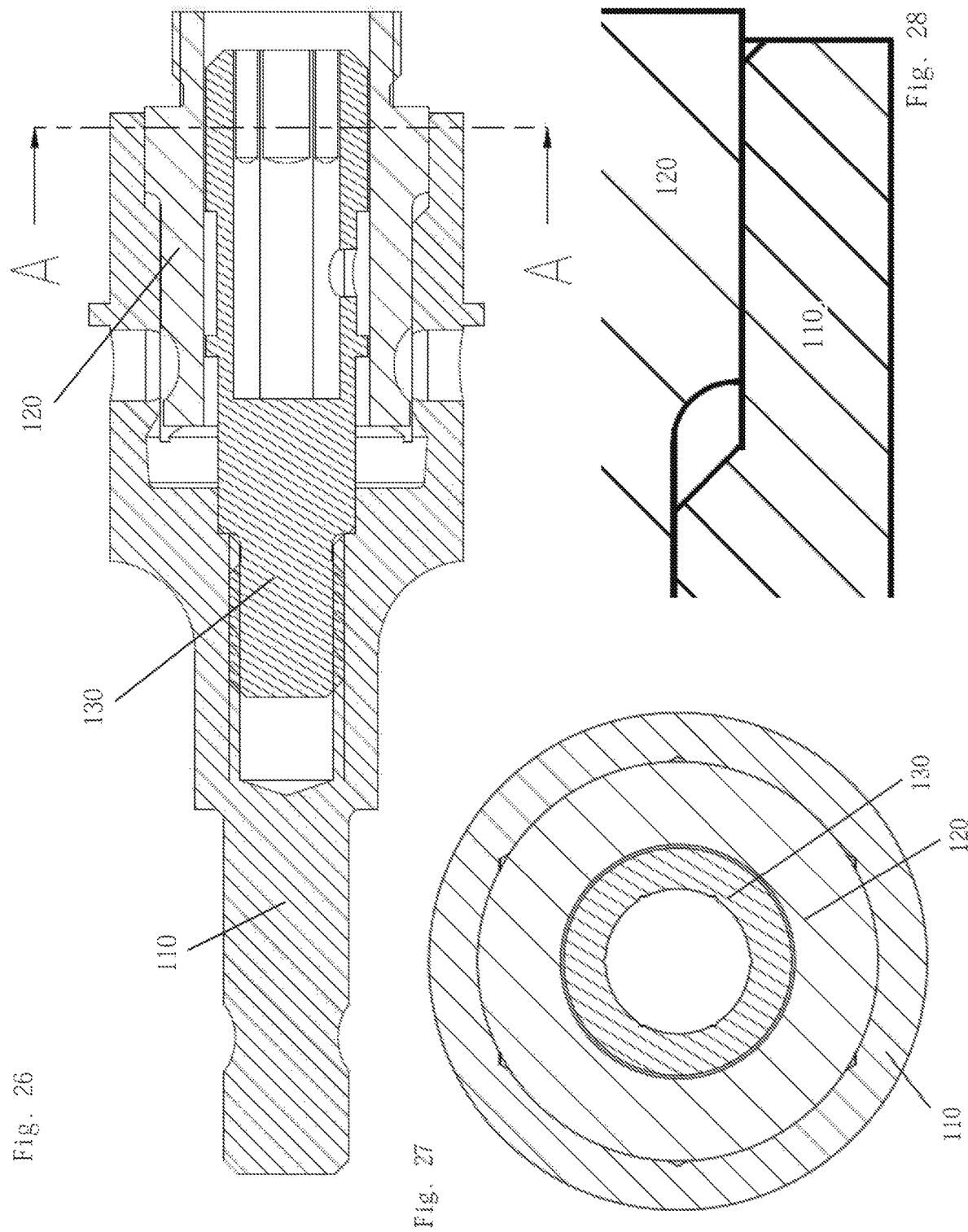

MANDREL ASSEMBLY FOR ELECTRIC TOOL AND ELECTRIC TOOL HAVING SAME

This application claims priority under 35 U.S.C. § 119 to patent application number CN 201610852003.7 filed on Sep. 27, 2016 in China, the disclosure of which is incorporated herein by reference in its entirety.

TECHNICAL FIELD

The present disclosure relates to the field of electric tool components and parts, in particular to a mandrel assembly for a hole saw.

BACKGROUND

In modern-day industry or engineering, a hole saw will generally be used to make round holes in various materials such as metal. Motive power must be provided to the hole saw during this process of saw cutting, therefore the hole saw is generally mounted on an electric tool such as an electric hand drill, percussion drill or radial drill for use therewith. To adapt to different hole saws and different electric tools, a mandrel assembly for providing connection and transmitting torque is generally disposed therebetween.

On the one hand, the coupling of a conventional mandrel assembly to a pilot drill, and the coupling of a conventional mandrel assembly to a hole saw, are usually accomplished by screw-thread fastening. It is time-consuming and laborious to fit the pilot drill and the hole saw to the mandrel with this coupling method, and replacement of the pilot drill and hole saw is inconvenient.

On the other hand, a conventional quick-fit mandrel assembly achieves quick fitting of a pilot drill and hole saw, but these quick-fit systems often mostly have a polygonal fit. This method of fitting can not only transmit twisting force but also achieve guiding; moreover, the processing precision thereof is low, and this will result in a large fitting gap. There is considerable rocking during formation of the hole, and this has an impact on use.

Specifically, a mandrel assembly of a conventional quick-fit system comprises components and parts such as a mandrel, an adapter and a bit coupler, and a screw-thread connection or hexagonal fit connection is mainly used between the various parts therein. When a pilot drill and a hole saw are mounted on the quick-fit system, there will be a very large fitting gap and mounting will not be coaxial, hence considerable vibration will arise during the process of hole formation, and this will have an impact on the hole-forming quality and service life of the hole saw. As a practical example, in a certain electric tool, a screw-thread connection is generally used between a mandrel thereof and a bit coupler, and there is no guiding face; an adapter and the mandrel are connected and guided in a loose hexagonal fashion; a bit and the bit coupler are connected and guided in a loose hexagonal fashion; and a hole saw is connected to the adapter by screw-threads. The loose hexagon fit at two positions in this electric tool result in a larger fitting gap, so considerable vibration occurs during the actual process of hole formation.

As the length of the structure of the hole saw itself increases, the abovementioned problem becomes more serious. For example, when it is used to cut metal, a pilot drill is unable to center the hole saw, so the hole saw will vibrate violently, resulting in very poor cutting quality. On the one hand, saw marks and scrapes with a very large span occur on the metal cutting face; this means that the hole saw is swinging throughout the operation and lacks good guidance. On the other hand, the bit of the pilot drill is not at the center of a slice; this means that the coaxiality of the bit and the hole saw is poor, so there is a large swinging space between the pilot drill and the hole saw. Furthermore, due to the lack of alignment between a bit and a cutting disk, it is difficult to remove a rejected cutting disk.

SUMMARY

An object of the present disclosure is to provide a mandrel assembly for an electric tool, which mandrel assembly can realize quick clamping and dismounting of a pilot drill and a hole saw, and also has a small fitting gap and good coaxiality.

Another object of the present disclosure is to provide an electric tool having the mandrel assembly.

To achieve the objects of the present disclosure, according to one aspect of the present disclosure a mandrel assembly for an electric tool is provided, comprising: a mandrel, comprising a shank part and, disposed in the mandrel axially, an adapter receiving part and a bit coupler receiving part; an adapter, comprising an internal hole which runs through the adapter axially; a bit coupler, comprising a first coupler section and a second coupler section which extend axially; and a bit connecting hole, disposed axially in the bit coupler, the bit connecting hole comprising a first polygonal section close to an inner side and a first cylindrical section close to an opening; wherein an outer wall of the adapter fits an inner wall of the adapter receiving part; an outer wall of the first coupler section fits an inner wall of the bit coupler receiving part; an outer wall of the second coupler section fits the internal hole of the adapter; the mandrel can transmit torque to the adapter and the bit coupler via the adapter receiving part and the bit coupler receiving part respectively. In the mandrel assembly according to the present disclosure, the bit connecting hole comprising the first polygonal section close to the inner side and the first cylindrical section close to the opening simultaneously achieves torque transfer and coaxial guidance between itself and a bit. On the one hand, transfer of torque from a driving part to the bit is achieved by fitting a polygonal part on the bit to the first polygonal section close to the inner side; on the other hand, guidance of the bit is also achieved through a tight fit between the first cylindrical section close to the opening and the bit, enabling the bit to maintain good coaxiality with the bit coupler.

Optionally, an outer wall of the second coupler section fits the internal hole of the adapter via a cylindrical surface. Through the guidance provided by the cylindrical surface, good coaxiality is maintained between the second coupler section and the internal hole of the adapter.

Optionally, the adapter fits the adapter receiving part polygonally. The transfer of torque generated by the driving part to the adapter via the adapter receiving part of the mandrel is thereby achieved.

Optionally, the bit coupler receiving part comprises a sunken hole; a part of the first coupler section fits the sunken hole via a cylindrical surface. Through the guidance provided by the cylindrical surface, good coaxiality is maintained between a part of the first coupler section and the sunken hole.

Optionally, the bit coupler receiving part also comprises a threaded internal hole; another part of the first coupler section fits the threaded internal hole by a threaded connection. A stable connection between the bit coupler and the mandrel is achieved by this threaded connection method.

Optionally, the adapter receiving part comprises a second polygonal section, and a second cylindrical section close to an opening; the adapter comprises a first adapter section which fits the second polygonal section, and a second adapter section which fits the second cylindrical section. The different forms of fitting between the two sections simultaneously achieve torque transfer between the mandrel and the adapter, and coaxial guidance. On the one hand, transfer of torque from the driving part to the adapter is achieved through the fit between the second polygonal section and the first adapter section; on the other hand, guidance of the adapter is also achieved through a tight fit between the second cylindrical section and the second adapter section, enabling the adapter to maintain good coaxiality with the mandrel.

Optionally, the first adapter section fits the second polygonal section polygonally, and the second adapter section fits the second cylindrical section via a cylindrical surface. A form of fitting between the two types of section mentioned above is provided more specifically here.

Optionally, a bit is also included, the bit comprising a bit polygonal section and a bit cylindrical section; the bit polygonal section and the first polygonal section of the bit connecting hole fit together and transfer torque; the bit cylindrical section and the first cylindrical section of the bit connecting hole fit together and provide guidance. Through the fit between the bit and the bit coupler, torque transfer and a guiding action therebetween are achieved effectively.

Optionally, also included is a first positioning bearing; and a first positioning hole is provided on a wall face of the adapter receiving part, a first positioning groove is provided on a wall face of the adapter, and the first positioning bearing is lodged in the first positioning groove via the first positioning hole. A method of axial positioning between the mandrel and the adapter is specifically provided here.

According to another aspect of the present disclosure, also provided is an electric tool, comprising: the mandrel assembly as described above, a driving part and a hole saw, wherein the driving part fits the shank part; and the hole saw fits the adapter. This not only ensures coaxiality between the mandrel assembly and the hole saw, but also ensures that the mandrel assembly can transfer torque stably to the hole saw.

BRIEF DESCRIPTION OF THE DRAWINGS

FIG. 4 is a broken sectional view from a first viewing angle of an embodiment of part of the bit of the present disclosure.

FIG. 5 is a broken sectional view from a second viewing angle of an embodiment of part of the bit of the present disclosure.

FIG. 8 is a perspective view of an embodiment of the adapter of the present disclosure.

FIG. 9 is a main view of the adapter in FIG. 8.

FIG. 10 is a sectional view of the adapter in FIG. 9.

FIG. 11 is a side view of the adapter in FIG. 8.

FIG. 12 is a sectional view of the connected parts of the mandrel and adapter of the present disclosure.

FIG. 13 is a sectional view along A-A in FIG. 12.

FIG. 14 is a sectional view of the connected parts of the mandrel and bit coupler of the present disclosure.

FIG. 15 is an enlarged schematic view of part of FIG. 14.

FIG. 18 is a schematic view of the electric tool of the present disclosure before assembly.

FIG. 19 is a schematic view of the electric tool of the present disclosure after assembly.

FIG. 20 is a perspective view of an adapter in another embodiment of the present disclosure.

FIG. 21 is a main view of the adapter in FIG. 20.

FIG. 22 is a sectional view of the adapter in FIG. 21.

FIG. 23 is a side view of the adapter in FIG. 20.

FIG. 26 is a sectional view of the connected parts of the mandrel and adapter in another embodiment of the present disclosure.

FIG. 27 is a sectional view along A-A in FIG. 26.

FIG. 28 is an enlarged schematic view of part of FIG. 26.

DETAILED DESCRIPTION

Figure 1:
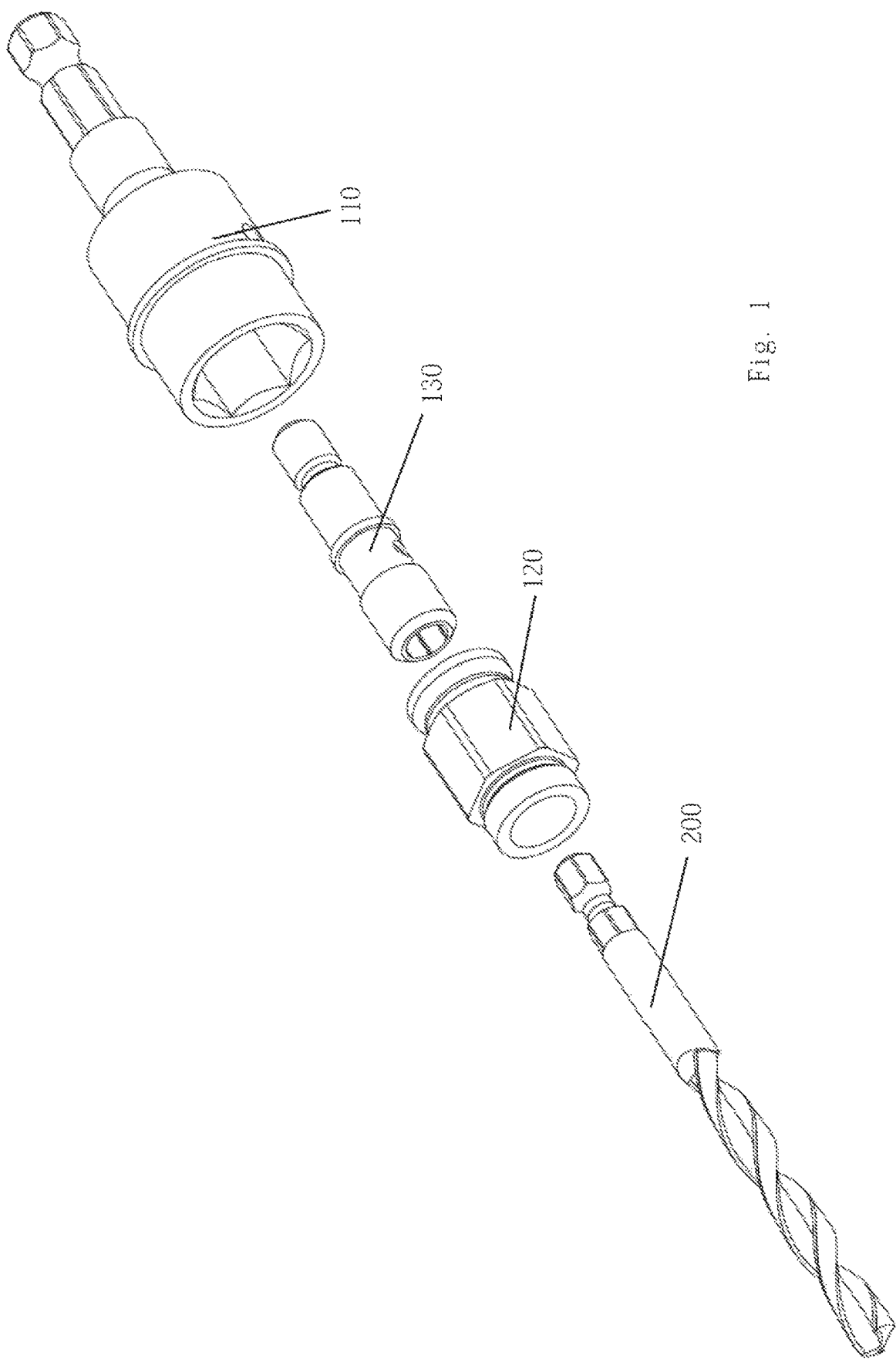
FIG. 1 is an exploded drawing of an embodiment of the mandrel assembly for an electric tool of the present disclosure.
Figure 2:
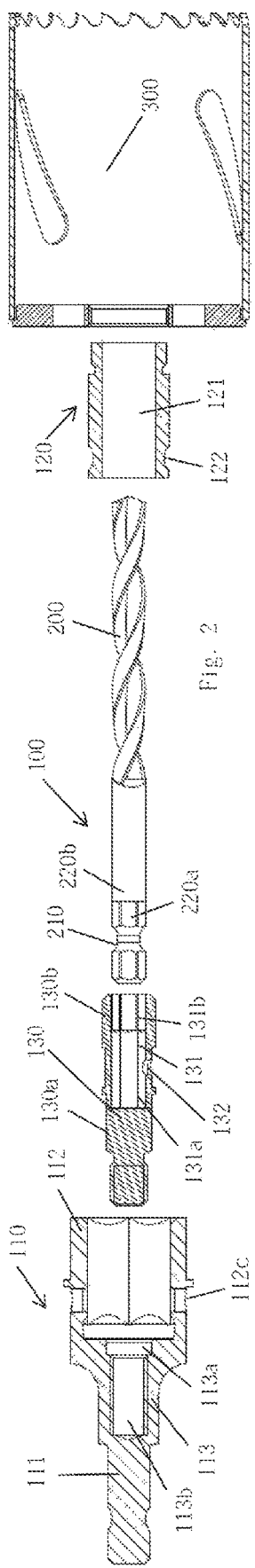
FIG. 2 is a sectional view of an embodiment of the mandrel assembly for an electric tool of the present disclosure.
Figure 3:
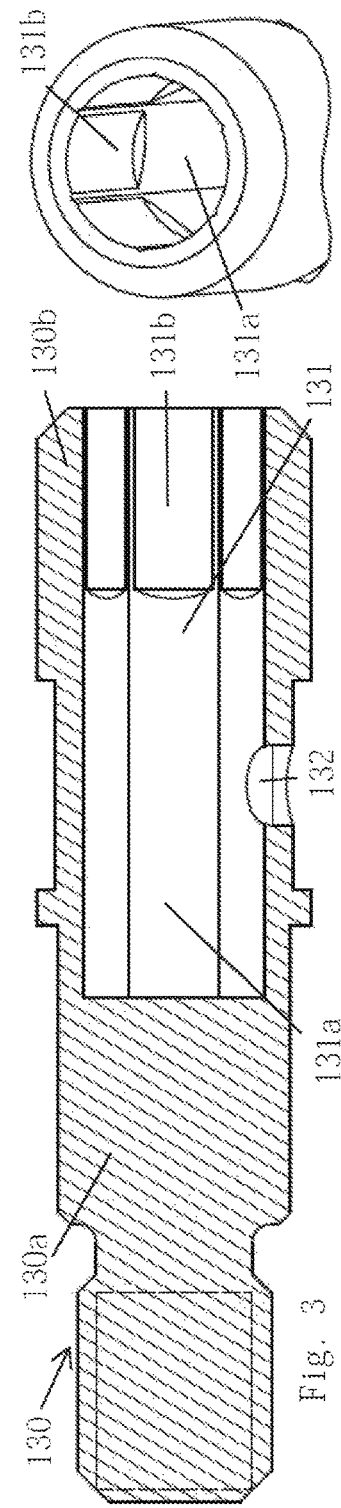
FIG. 3 is a sectional view of an embodiment of the bit coupler of the present disclosure.
Figure 6:
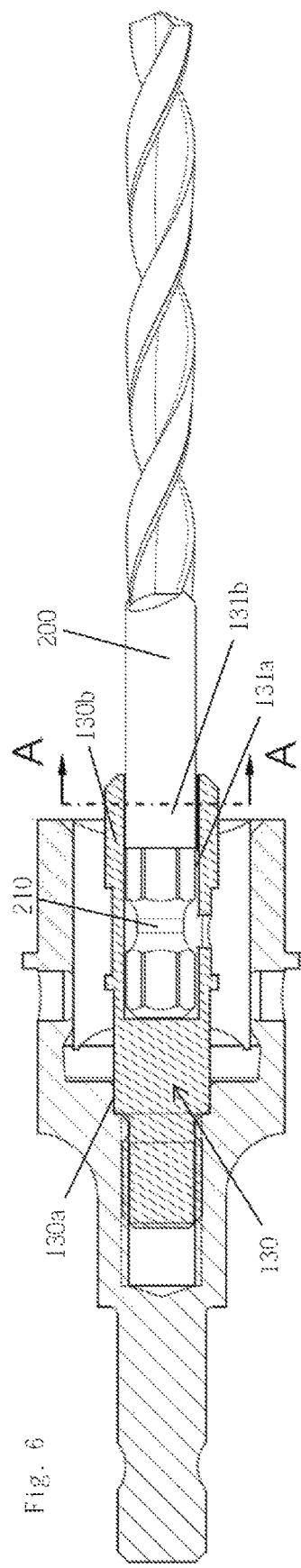
FIG. 6 is a sectional view of the connected parts of the bit coupler and bit of the mandrel assembly of the present disclosure.
Figure 7:
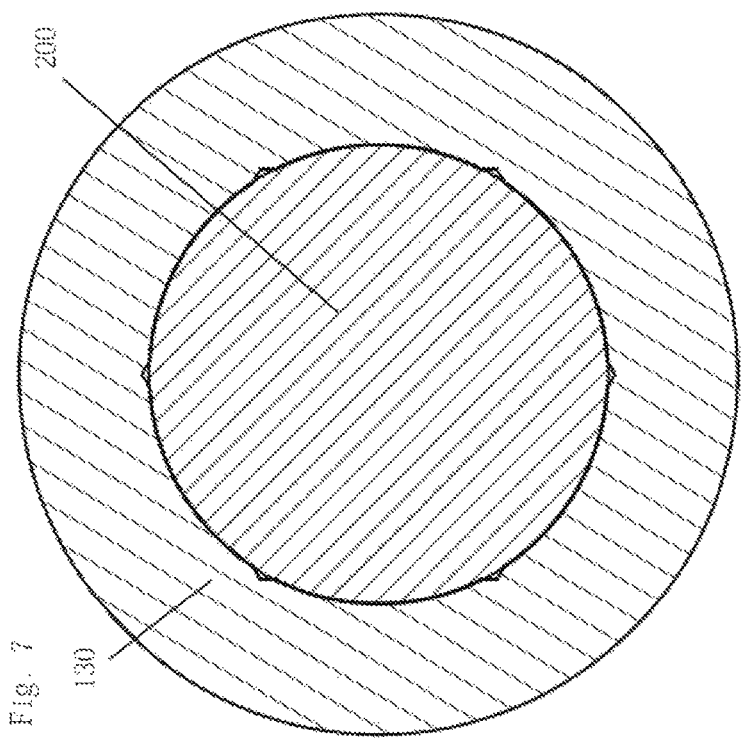
FIG. 7 is an A-A sectional view of the mandrel assembly in FIG. 6.

Referring to FIGS. 1 and 2, which show an embodiment of a mandrel assembly of a quick-fit system for an electric tool, the mandrel assembly 100 comprises: a mandrel 110, comprising a shank part 111 and, disposed in the mandrel 110 axially, an adapter receiving part 112 and a bit coupler receiving part 113; an adapter 120, comprising an internal hole 121 which runs through the adapter 120 axially; a bit coupler 130, comprising a first coupler section 130a and a second coupler section 130b which extend axially; and a bit connecting hole 131, disposed axially in the bit coupler 130; wherein an outer wall of the adapter 120 fits an inner wall of the adapter receiving part 112; an outer wall of the first coupler section 130a fits an inner wall of the bit coupler receiving part 113; an outer wall of the second coupler section 130b fits the internal hole 121 of the adapter 120; the mandrel 110 can transmit torque to the adapter 120 and the bit coupler 130 via the adapter receiving part 112 and the bit coupler receiving part 113 respectively.

In this embodiment, the method of connection between the bit connecting hole and a bit has been improved. Specifically, further referring to FIGS. 2 to 7, the bit connecting hole 131 comprises a first polygonal section 131a close to an inner side and a first cylindrical section 131b close to an opening. Such a bit connecting hole 131, having two sections of different shapes, can simultaneously achieve torque transfer and coaxial guidance between itself and the bit. On the one hand, transfer of torque from a driving part to the bit 200 is achieved by fitting a polygonal part 220a on the bit 200 to the first polygonal section 131a close to the inner side; on the other hand, guidance of the bit is also achieved through a tight fit between the first cylindrical section 131b close to the opening and a cylinder part 220b of the bit 200, thereby reducing a swing gap between a pilot drill and the bit coupler, enabling the pilot drill to maintain good coaxiality with the bit coupler, and thereby also improving a stabilizing/centering function of the pilot drill.

Optionally, the diameter of the cylindrical section 131b resulting from the improvement need not be greater than the diameter of a circumscribed circle of the first polygonal section 131a, but must be greater than the diameter of the inscribed circle of the first polygonal section 131a.

Optionally, reference is made to FIGS. 9 to 13, which show in detail the structure of the adapter and the method of connection between the adapter and the mandrel. The adapter 120 in this embodiment comprises a cylindrical adapter internal hole 121 and a polygonal outer wall. With such an arrangement, an outer wall of the second coupler section 130b fits the internal hole 121 of the adapter 120 via a cylindrical surface. In the case of machined components, the precision thereby achieved is higher than that of a conventionally used polygonal fit. Through the guidance provided by the cylindrical surface, good coaxiality is maintained between the second coupler section 130b and the internal hole 121 of the adapter. In addition, the adapter 120 fits the adapter receiving part 112 polygonally. The transfer of torque generated by the driving part to the adapter via the adapter receiving part of the mandrel is thereby achieved. In other words, the second coupler section 130b and the internal hole 121 of the adapter need only realize a guiding function, while the objective of torque transfer is realized by the interaction between the inner wall of the adapter receiving part 112 of the mandrel 110 and the outer wall of the adapter 120.

Optionally, referring to FIGS. 14 to 15, the bit coupler receiving part 113 comprises a sunken hole 113a; a part of the first coupler section 130a fits the sunken hole 113a by means of a cylindrical surface. Through the guidance provided by the cylindrical surface, good coaxiality is maintained between a part of the first coupler section and the sunken hole. In addition, the bit coupler receiving part 113 also comprises a threaded internal hole 113b; another part of the first coupler section 130a fits the threaded internal hole 113b by a threaded connection. A stable connection between the bit coupler and the mandrel is achieved by this threaded connection method.

Figure 16:
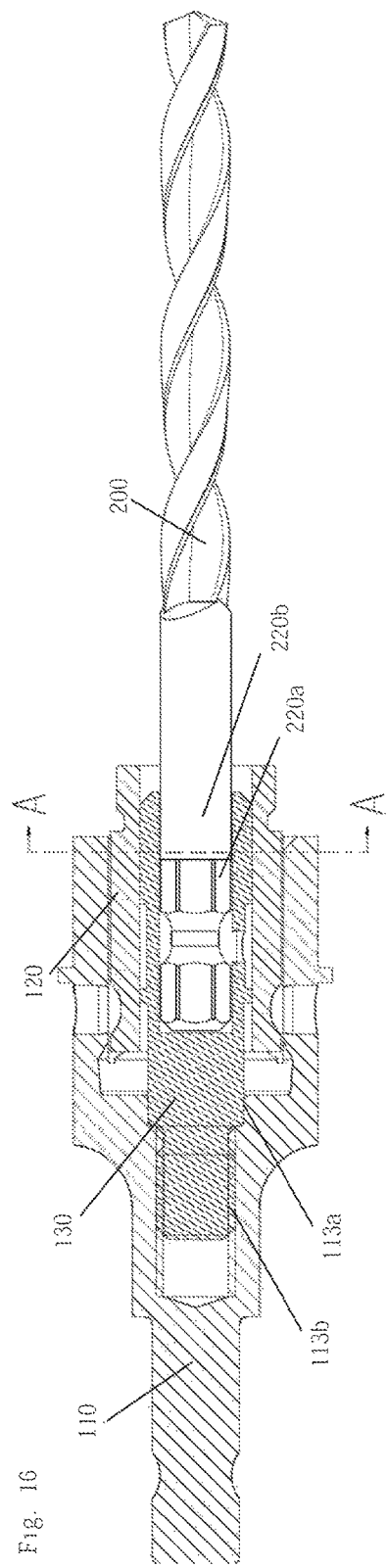
FIG. 16 is a view of an embodiment of the mandrel assembly of the present disclosure in assembled form.
Figure 17:
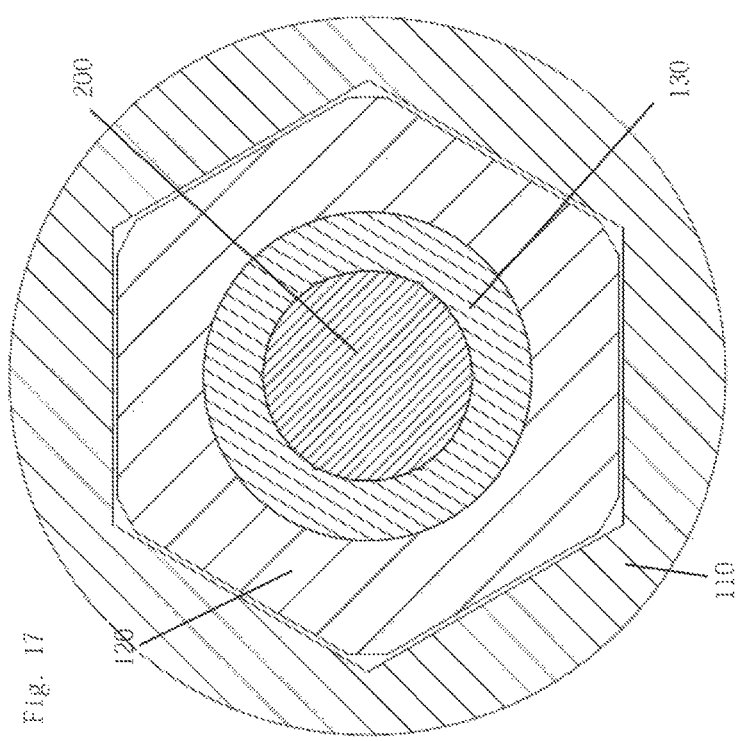
FIG. 17 is a sectional view along A-A in FIG. 16.
Figure 24:
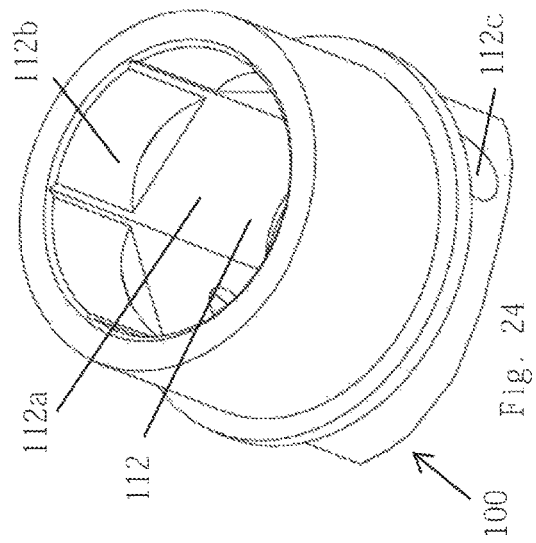
FIG. 24 is a perspective drawing of part of the mandrel in another embodiment of the present disclosure.
Figure 25:
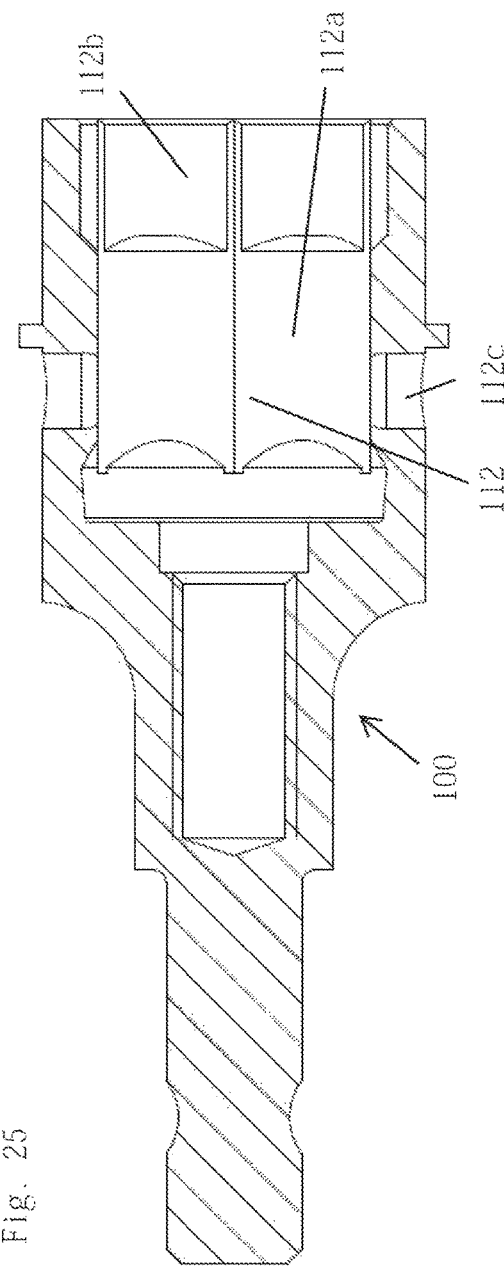
FIG. 25 is a sectional view of the mandrel in FIG. 24.
Figure 29:
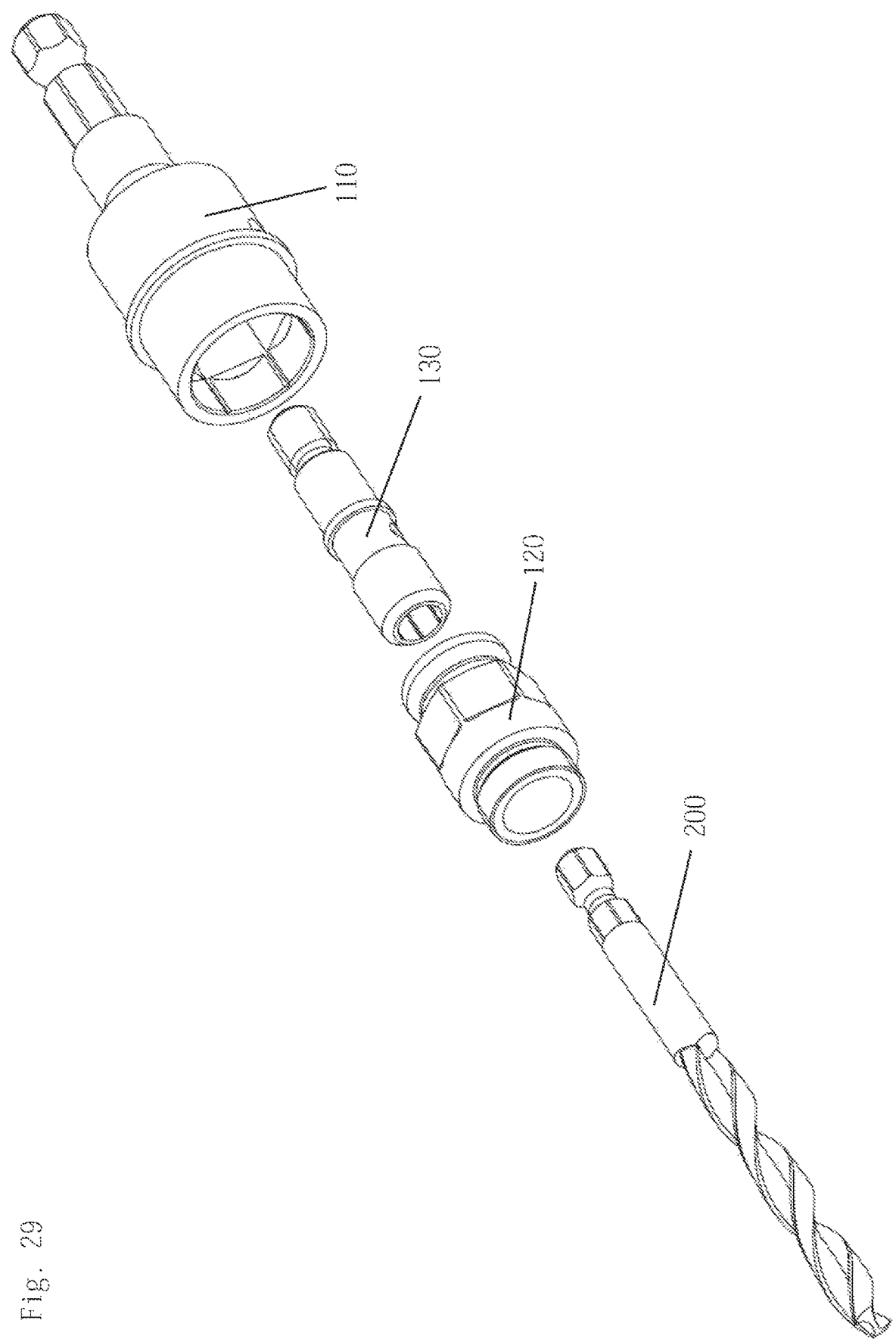
FIG. 29 is an exploded drawing of components of the mandrel assembly in another embodiment of the present disclosure.

Now that the various components and parts and the methods of connection thereof in the embodiment above have been described one by one, reference may be made to FIGS. 16 and 17 for details of the form of overall assembly thereof. It can be seen from the drawings that, on the one hand, the cylindrical fit between the bit 200, bit coupler 130 and adapter 120 achieves an excellent result in terms of guidance therebetween, ensuring the coaxiality of components; on the other hand, the mandrel 110 achieves, by means of a polygonal fit with the adapter 120 and the bit coupler 130 respectively, the effect of torque transfer to the two, and the bit coupler 130 further achieves, by means of a polygonal fit with the bit, the effect of torque transfer thereto.

Optionally, in another improved embodiment of the present disclosure, a mandrel assembly is further provided. Referring to FIGS. 20 to 29, the mandrel assembly makes a further improvement to the adapter and mandrel, such that the method of fitting between the two, which originally only provided torque transfer, is changed to a method of fitting which simultaneously provides both torque transfer and guidance. Specifically, the adapter receiving part 112 comprises a second polygonal section 112a, and a second cylindrical section 112b close to an opening; the adapter 120 comprises a first adapter section 120a which fits the second polygonal section 112a, and a second adapter section 120b which fits the second cylindrical section 112b. On the one hand, transfer of torque from the driving part to the adapter is achieved through the fit between the second polygonal section 112a and the first adapter section 120a; on the other hand, guidance of the adapter is also achieved through a tight fit between the second cylindrical section 112b and the second adapter section 120b, enabling the adapter to maintain good coaxiality with the mandrel.

Optionally, a form of fitting between two sections in the embodiment above is also specifically provided here. For example, the first adapter section 120a fits the second polygonal section 112a polygonally, and the second adapter section 120b fits the second cylindrical section 112b by means of a cylindrical surface.

With respect to the two embodiments described above and any variation thereof, a method of axial positioning between the mandrel and the adapter is also specifically provided here. The mandrel assembly may additionally comprise a first positioning bearing; and a first positioning hole 112c is provided on a wall face of the adapter receiving part 112, a first positioning groove 122 is provided on a wall face of the adapter 120, and the first positioning bearing is lodged in the first positioning groove 122 via the first positioning hole 112c.

Figure 30:
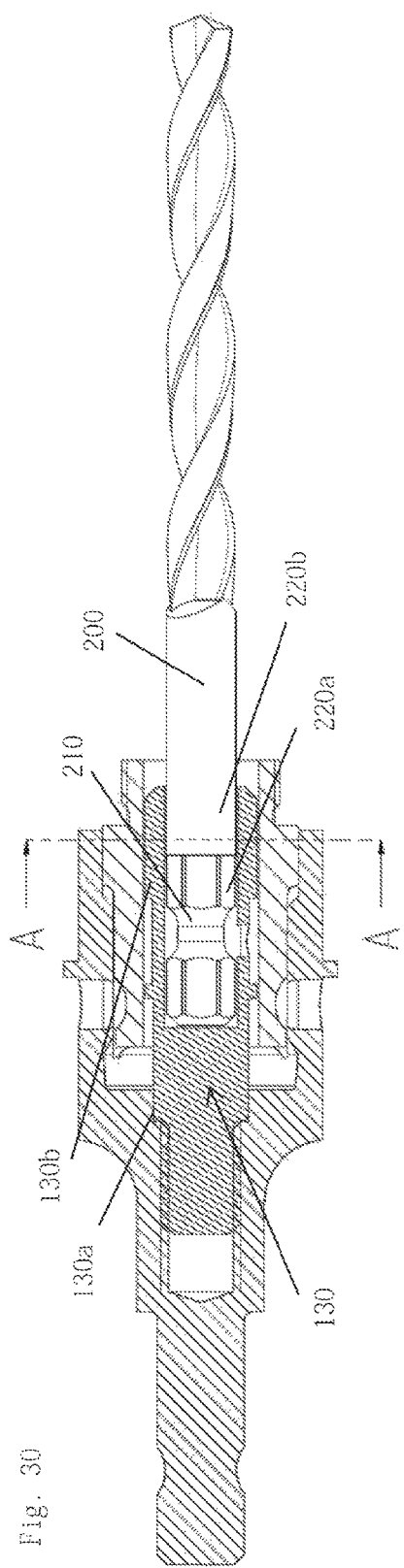
FIG. 30 is a schematic view of the mandrel assembly in another embodiment of the present disclosure in assembled form.
Figure 31:
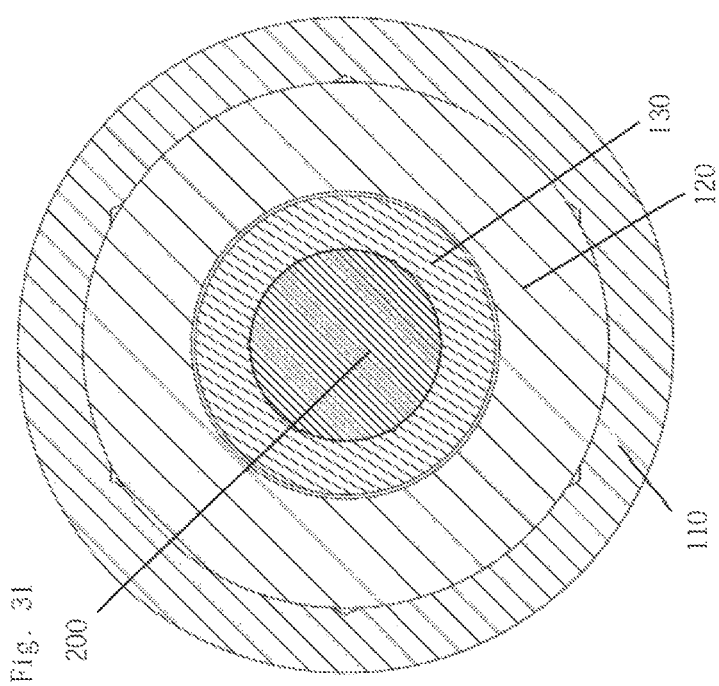
FIG. 31 is a sectional view along A-A in FIG. 30.

Now that the various components and parts and the methods of connection thereof in this embodiment have been described one by one, reference may be made to FIGS. 30 and 31 for details of the form of overall assembly thereof. It can be seen from the drawings that, on the one hand, the cylindrical fit between the bit 200, bit coupler 130, adapter 120 and mandrel 110 achieves an excellent result in terms of guidance therebetween, ensuring the coaxiality of components; on the other hand, the mandrel 110 achieves, by means of a polygonal fit with the adapter 120 and the bit coupler 130 respectively, the effect of torque transfer to the two, and the bit coupler 130 further achieves, by means of a polygonal fit with the bit, the effect of torque transfer thereto.

In addition, according to another aspect of the present concept, an electric tool is further provided, comprising: the mandrel assembly 100 in any one of the embodiments above or variations thereof, a driving part and a hole saw 300; wherein the driving part fits the shank part 111; and the hole saw 300 fits the adapter 120. This ensures not only coaxiality between the mandrel assembly and the hole saw, but also stable transfer of torque from the mandrel assembly to the bit and hole saw.

Optionally, a method of axial positioning between the bit coupler and the bit is also specifically provided here. Also included is a second positioning bearing; and a second positioning hole 132 is provided on a wall face of the bit coupler 130, a second positioning groove 210 is provided on a wall face of the bit 200, and the second positioning bearing is lodged in the second positioning groove 210 via the second positioning hole 132.

The mandrel assembly in the first embodiment above may be disassembled/assembled quickly. For example, referring to FIGS. 18 and 19, during actual application, before the apparatus leaves the factory, a part of the first coupler section 130a of the bit coupler 130 has already been fitted to the sunken hole 113a of the bit coupler receiving part 113 of the mandrel 110 to provide guidance, and another part of the first coupler section 130a of the bit coupler 130 is connected by screw-threads to the threaded internal hole 113b of the bit coupler receiving part 113 of the mandrel 110, so that a connection between the bit coupler 130 and the mandrel 110 has already been established before the apparatus leaves the factory, i.e. the two are thereafter always used in the form of a whole. Subsequently, the bit 200 is fitted to the first polygonal section 131a and the first cylindrical section 131b in the bit connecting hole 131 of the bit coupler 130, achieving guidance and torque transfer between the bit 200 and the bit coupler 130. In addition, the hole saw 300 is connected by screw threads to the adapter 120. Finally, the adapter 120 together with the hole saw 300 is inserted into the adapter receiving part 112 of the mandrel 110, and the polygonal inner/outer wall faces of the two fit together to provide transfer of torque; at the same time, the internal hole 121 of the adapter 120 encloses the second coupler section 130b of the bit coupler 130, and fits same to provide guidance, and assembly of the entire electric tool is thereby completed. Disassembly can be achieved in a reverse manner.

In addition, if the mandrel assembly in the second embodiment described above is installed, then the first adapter section 120a and second adapter section 120b of the adapter 120 are furthermore fitted to the second polygonal section 112a and second cylindrical section 112b of the adapter receiving part 112 respectively, to realize torque transfer and guidance between the two. In the process of assembly described above, there is a good degree of guidance and coaxiality among components; swinging does not readily occur, and stable transfer of torque is possible. Thus, cutting quality is improved, saw marks are reduced, and the service life of the hole saw is improved.

Particular embodiments of the present disclosure have been described in detail above according to the accompanying drawings. Those skilled in the art could, based on the explanation above, make equivalent alterations or changes to specific features in the embodiments, and there is no doubt that such altered embodiments would also fall within the scope of protection covered by the claims.

What is claimed is:

1. A mandrel assembly for an electric tool, comprising:
    a mandrel, including:
        a shank part;
        an adapter receiving part axially disposed on the mandrel; and
        a bit coupler receiving part axially disposed on the mandrel;
    an adapter, including an internal hole that runs through the adapter axially; and
    a bit coupler, including:
        a first axial coupler section;
        a second axial coupler section; and
        a bit connecting hole disposed axially in the bit coupler, the bit connecting hole having a first polygonal section proximate to an inner side of the bit connecting hole and a first cylindrical section proximate to an opening of the bit connecting hole, wherein:
    an outer wall of the adapter is configured to fit with an inner wall of the adapter receiving part, an outer wall of the first coupler section is configured to fit with an inner wall of the bit coupler receiving part, and, an outer wall of the second coupler section is configured to fit with the internal hole of the adapter such that the mandrel is configured to transmit torque to the adapter via the adapter receiving part, and to the bit coupler via the bit coupler receiving part;
    the bit coupler receiving part further has a threaded internal hole; and
    a first part of the first coupler section is configured to fit with the threaded internal hole via a threaded connection.

2. The mandrel assembly according to claim 1, wherein an outer wall of the second coupler section has a cylindrical surface configured to fit with the internal hole of the adapter.

3. The mandrel assembly according to claim 2, wherein the adapter is configured to fit with the adapter receiving part polygonally.

4. The mandrel assembly according to claim 1, wherein:
    the bit coupler receiving part has a sunken hole; and
    a second part of the first coupler section has a cylindrical surface configured to fit with the sunken hole.

5. The mandrel assembly according to claim 1, wherein:
    the adapter receiving part has:
        a second polygonal section; and
        a second cylindrical section proximate to an opening of the adapter receiving part; and
    the adapter includes:
        a first adapter section configured to fit with the second polygonal section; and
        a second adapter section configured to fit with the second cylindrical section.

6. The mandrel assembly according to claim 5, wherein:
    the first adapter section is configured to fit with the second polygonal section polygonally; and
    the second adapter section has a cylindrical surface configured to fit with the second cylindrical section.

7. The mandrel assembly according to claim 1, further comprising:
    a bit including:
    a bit polygonal section configured to fit with the bit connecting hole to transfer torque; and
    a bit cylindrical section configured to fit with the first cylindrical section of the bit connecting hole to guide the bit within the bit connecting hole.

8. The mandrel assembly according to claim 1, further comprising:
    a first positioning bearing, wherein:
        a wall face of the adapter receiving part includes a first positioning hole;
        a wall face of the adapter includes a first positioning groove; and
        the first positioning bearing is configured to be at least partially received in the first positioning groove via the first positioning hole.

9. An electric tool, comprising:
    a mandrel assembly that includes:
        a mandrel, having:
            a shank part;
            an adapter receiving part axially disposed on the mandrel; and
            a bit coupler receiving part axially disposed on the mandrel and including a threaded internal hole;
        an adapter including an internal hole that runs through the adapter axially; and
        a bit coupler having:
            a first axial coupler section configured to fit with the threaded internal hole via a threaded connection;
            a second axial coupler section; and
            a bit connecting hole disposed axially in the bit coupler, the bit connecting hole having a first polygonal section proximate to an inner side of the bit connecting hole and a first cylindrical section proximate to an opening of the bit connecting hole, wherein
an outer wall of the adapter is configured to fit with an inner wall of the adapter receiving part,
an outer wall of the first coupler section is configured to fit with an inner wall of the bit coupler receiving part, and
an outer wall of the second coupler section is configured to fit with the internal hole of the adapter such that the mandrel is configured to transmit torque to the adapter via the adapter receiving part, and to the bit coupler via the bit coupler receiving part;

a driving part configured to fit with shank part; and
a hole saw configured to fit with the adapter.

10. A mandrel assembly for an electric tool, comprising:
a mandrel, including:
a shank part;
an adapter receiving part axially disposed on the mandrel; and
a bit coupler receiving part axially disposed on the mandrel;
an adapter, including an internal hole that runs through the adapter axially; and
a bit coupler, including:
a first axial coupler section;
a second axial coupler section; and
a bit connecting hole disposed axially in the bit coupler, the bit connecting hole having a first polygonal section proximate to an inner side of the bit connecting hole and a first cylindrical section proximate to an opening of the bit connecting hole, wherein:
an outer wall of the adapter is configured to fit with an inner wall of the adapter receiving part;
an outer wall of the first coupler section is configured to fit with an inner wall of the bit coupler receiving part;
an outer wall of the second coupler section is configured to fit with the internal hole of the adapter such that the mandrel is configured to transmit torque to the adapter via the adapter receiving part, and to the bit coupler via the bit coupler receiving part;
the adapter receiving part has:
a second polygonal section; and
a second cylindrical section proximate to an opening of the adapter receiving part; and
the adapter includes:
a first adapter section configured to fit with the second polygonal section; and
a second adapter section configured to fit with the second cylindrical section, wherein:
the first adapter section is configured to fit with the second polygonal section polygonally; and
the second adapter section has a cylindrical surface configured to fit with the second cylindrical section.

* * * * *

UNITED STATES PATENT AND TRADEMARK OFFICE
CERTIFICATE OF CORRECTION

PATENT NO. : 10,549,357 B2
APPLICATION NO. : 15/714658
DATED : February 4, 2020
INVENTOR(S) : Daniel Grolimund and Donghui Ding It is certified that error appears in the above-identified patent and that said Letters Patent is hereby corrected as shown below:

On the Title Page

Item "(72) Inventors:" for inventor Donghui Ding, please delete the word "Zhejiang" and replace it with the word --Hangzhou--.

Signed and Sealed this
Fifth Day of May, 2020

Andrei Iancu
*Director of the United States Patent and Trademark Office*